United States Patent
Lin et al.

(10) Patent No.: US 7,477,331 B2
(45) Date of Patent: Jan. 13, 2009

(54) 2D/3D DISPLAY AND METHOD FOR FORMING 3D IMAGE

(75) Inventors: Yung-Lun Lin, Wujie Township, Yilan County (TW); Chih-Jen Hu, Hsinchu (TW); Ming-Chou Wu, Nantou (TW); Chih-Ming Chang, Jhongli (TW)

(73) Assignee: AU Optronics Corp., Hsinchu (TW)

( * ) Notice: Subject to any disclaimer, the term of this patent is extended or adjusted under 35 U.S.C. 154(b) by 468 days.

(21) Appl. No.: 11/117,257

(22) Filed: Apr. 28, 2005

(65) Prior Publication Data

US 2006/0170833 A1    Aug. 3, 2006

(30) Foreign Application Priority Data

Feb. 3, 2005    (TW) .............................. 94103365 A

(51) Int. Cl.
*G02F 1/1335* (2006.01)
(52) U.S. Cl. .................. 349/15; 349/96; 349/117; 348/51
(58) Field of Classification Search .................. 349/15, 349/96, 117; 348/51
See application file for complete search history.

(56) References Cited

U.S. PATENT DOCUMENTS

| 6,157,424 A | 12/2000 | Eichenlaub .................. 349/74 |
| 2004/0109115 A1* | 6/2004 | Tsai et al. .................. 349/117 |
| 2004/0160177 A1 | 8/2004 | Uchida et al. ............... 313/506 |
| 2005/0062905 A1* | 3/2005 | Kim et al. .................... 349/95 |
| 2005/0134762 A1* | 6/2005 | Sung et al. .................... 349/96 |
| 2006/0139448 A1* | 6/2006 | Ha et al. ....................... 348/51 |

FOREIGN PATENT DOCUMENTS

| CN | 1573435 | 2/2005 |
| JP | 2003185991 | 7/2003 |

* cited by examiner

*Primary Examiner*—Julie Ngo
(74) *Attorney, Agent, or Firm*—Thomas, Kayden, Horstemeyer & Risley

(57) ABSTRACT

A display capable of providing 2D and/or 3D images. The display comprises a liquid crystal display device and a self-emissive display device. The self-emissive display device is disposed on the rear of the liquid crystal display device, in which the liquid crystal display device provides a first image and the self-emissive display device a second image and a backlight source. One of the first and second images comprises a parallax barrier pattern for forming a three-dimensional (3D) image, and the other is a 2D image.

4 Claims, 7 Drawing Sheets

2D/3D DISPLAY AND METHOD FOR FORMING 3D IMAGE

BACKGROUND

The invention relates to a flat panel display and in particular to a flat panel display capable of providing 2D and 3D images.

In a conventional stereoscopic or three-dimensional (3D) display, users are required to wear a device, such as a shutter or polarization glasses, that ensure left and right views are seen by the correct eye. Such a stereoscopic display, however, suffers from the drawback that the viewers must wear, or be very close to, the device to separate left and right eye views.

Recently, many stereoscopic display designs, such as lenticular and parallax designs have been proposed which do not require use of shutter or polarization glasses. In these stereoscopic display devices, specific optical devices such as lenticular lens or parallax barriers are generally disposed on the front or rear sides of image display devices. For example, a simple stereoscopic image display device can be easily constituted by a combination of such parallax barriers and a two-dimensional (2D) display device, such as a liquid crystal display (LCD). Half the pixels of the display device radiate light only in directions seen by the left eye and half the pixels in directions seen by the right eye through the parallax barrier, creating twin-view stereoscopic images. Conventionally, the parallax barrier comprises a retarder which suffers from the drawback of difficult alignment between the LCD and the parallax barrier.

U.S. Pat. No. 6,157,424 discloses a 2D/3D image display, in which two LCDs are employed. One of the LCDs provides image information and the other parallax barrier image patterns. LCDS, however, suffer from the drawback of higher power consumption due to back light device.

SUMMARY

A 2D/3D display and methods for forming a 3D image are provided. An embodiment of a 2D/3D display comprises a liquid crystal display device and a self-emissive display device. The liquid crystal display device provides a first image. The self-emissive display device is disposed on the rear of the liquid crystal display device, providing a backlight source and a second image. One of the first and second images comprises a parallax barrier pattern for forming a 3D image, and the other is a 2D image.

An embodiment of a method for forming a 3D image comprising forming a 2D image by a liquid crystal display device is provided. An image with a parallax barrier pattern is formed behind the 2D image by a self-emissive display device, such that a viewer sees a 3D image from the liquid crystal display device side by transferring the 2D image through the parallax barrier pattern.

Additionally, an embodiment of a method for forming a 3D image comprising forming a 2D image by a self-emissive display device is provided. An image with a parallax barrier pattern is formed in front of the 2D image by a liquid crystal display device, such that a viewer sees a 3D image from the liquid crystal display device side by transferring the 2D image through the parallax barrier pattern.

DESCRIPTION OF THE DRAWINGS

A 2D/3D display and methods for forming a 3D image will become more fully understood from the detailed description given hereinbelow and the accompanying drawings, given by way of illustration only and thus not intended to be limitative of the invention.

DETAILED DESCRIPTION

Figure 1A:
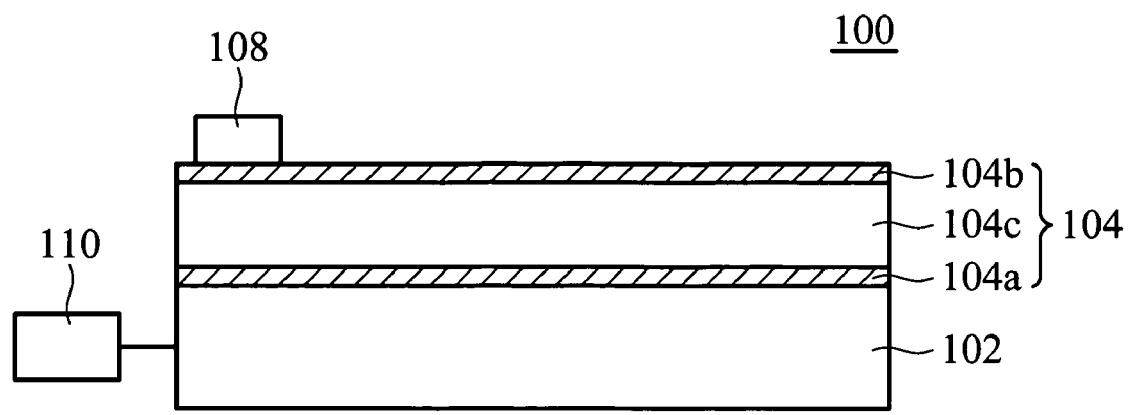
FIGS. 1a and 2a are cross-sections of embodiments of 2D/3D display of the invention.
Figure 2A:
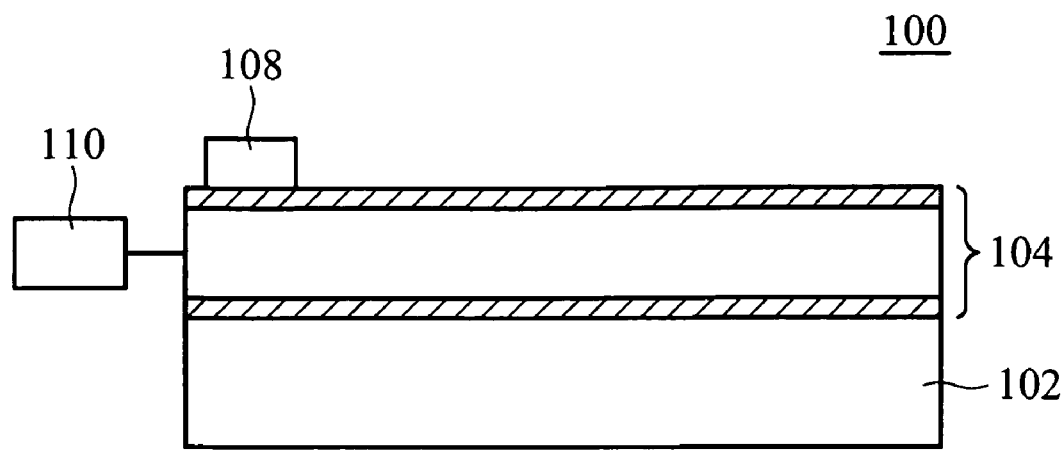

A 2D/3D display and methods for forming a 3D image will be described in greater detail in the following. FIGS. 1a and 2a illustrate embodiments of 2D/3D display 100. The display 100 comprises a self-emissive display device 102, a liquid crystal display device 104, a detector device 108, and a control device 110. The liquid crystal display device 104 provides a first image, such as a 2D image. Typically, the liquid crystal display device 104 comprises an upper substrate 104b, a lower substrate 104a, and a liquid crystal layer 104c interposed between the upper and lower substrates 104b and 104a, wherein color filters (not shown) may be disposed on the upper or lower substrate 104b or 104a. The self-emissive display device 102 is disposed on the rear of the liquid crystal display device 104, serving as a backlight source for the liquid crystal display device 104 and providing a second image, such as a 2D image. In this embodiment, the self-emissive display device 102 may comprise a plasma display device, an organic light-emitting device, or other electroluminescent display device. The first or second image presented on display 100 in a 2D mode may comprise a clear pattern. For example, the self-emissive display device 102 only serves as a backlight source without providing any image information (that is, a clear pattern). The 2D image information is provided by the liquid crystal display device 104. Conversely, the 2D image information may be provided by the self-emissive display device 102, while the liquid crystal display device 104 does not display any image information. Moreover, the first or second image may provide a parallax pattern formed by a 2D image when the display in a 3D mode. For example, the parallax barrier pattern may be provided by the self-emissive display device 102. The 2D image information provided by the liquid crystal display device 104 may be transformed into the 3D image information through the parallax barrier pattern. Conversely, the parallax barrier pattern may be provided by the liquid crystal display device 104. The 2D image information provided by the self-emissive display device 102 may also be transformed into the 3D image information through the parallax barrier pattern. In this case, the liquid crystal display device 104 may not require color filters.

The detector device 108 is coupled to the liquid crystal display device 104, measuring a distance between a viewer and the display 100. Moreover, the control device 110 is coupled to the display device providing the parallax barrier pattern, such as the self-emissive display device 102 (as shown in FIG. 1a) or the liquid crystal display device (as shown in FIG. 2a), thereby adjusting the parallax barrier pattern in the 3D mode according to the distance between a viewer and the display 100.

Figure 1B:
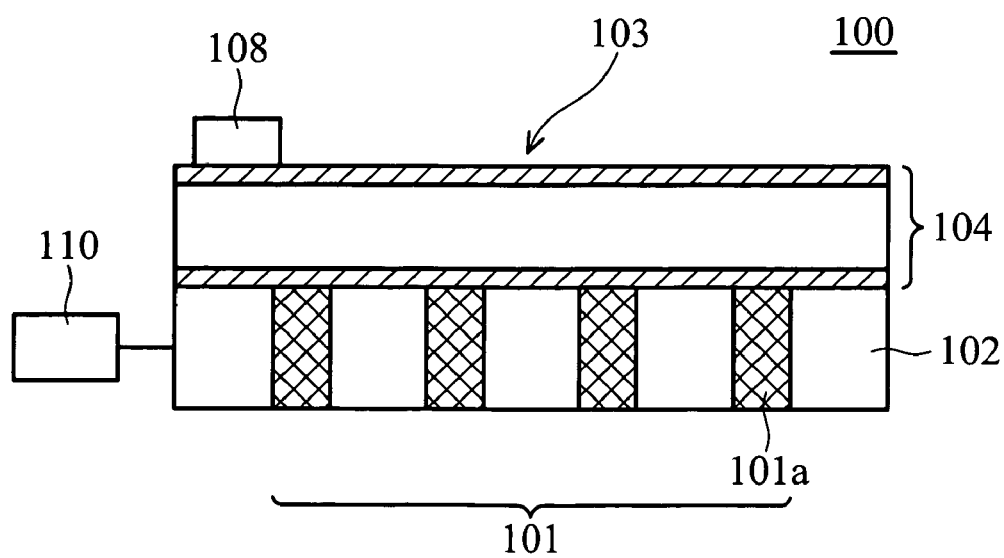
FIGS. 1b, 1c, 2b, and 2c are cross-sections of embodiments of methods for forming a 3D image of the invention.

FIG. 1b illustrates an embodiment of a method for forming a 3D image. A 2D image 103 is provided by the liquid crystal display device 104. Another 2D image with a parallax barrier pattern is provided by the self-emissive display device 102 disposed on the rear of the liquid crystal display device 104, such that a 3D image 103 is observed by a viewer from the liquid crystal display device 104 side by transferring the 2D image 103 through the parallax barrier pattern 101.

Figure 3A:
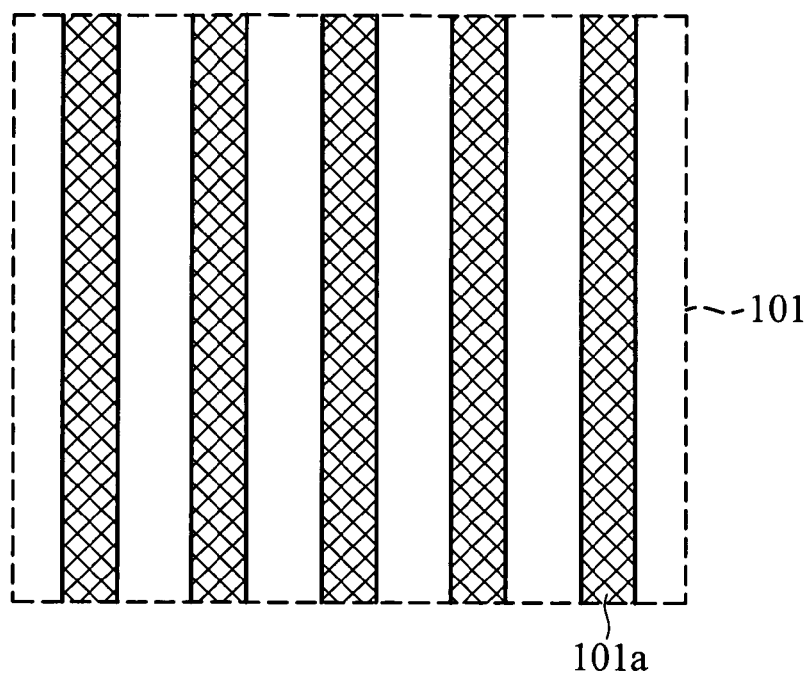
FIGS. 3a and 3b are cross-sections of embodiments of parallax barrier patterns of the invention.
Figure 3B:
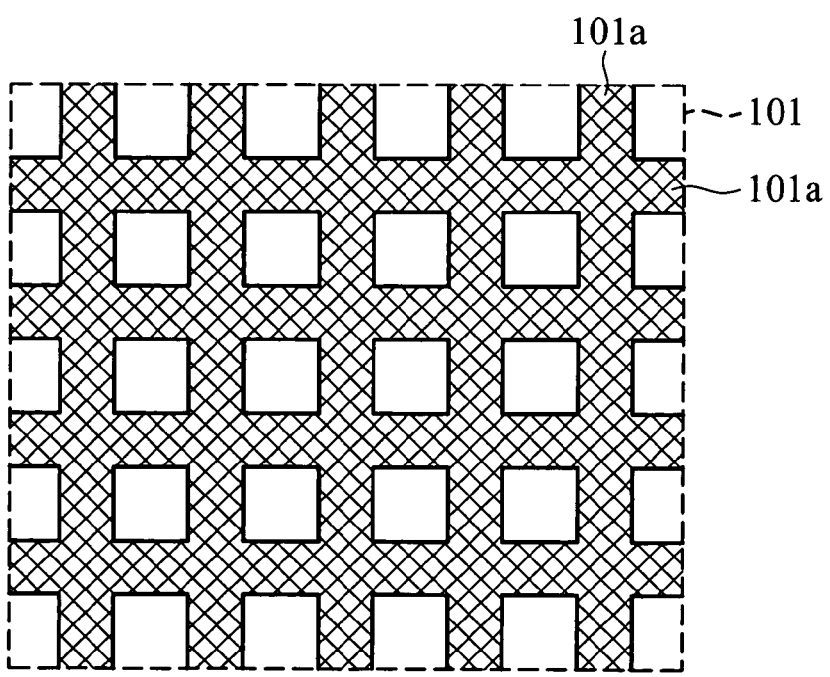
Figure 5A:
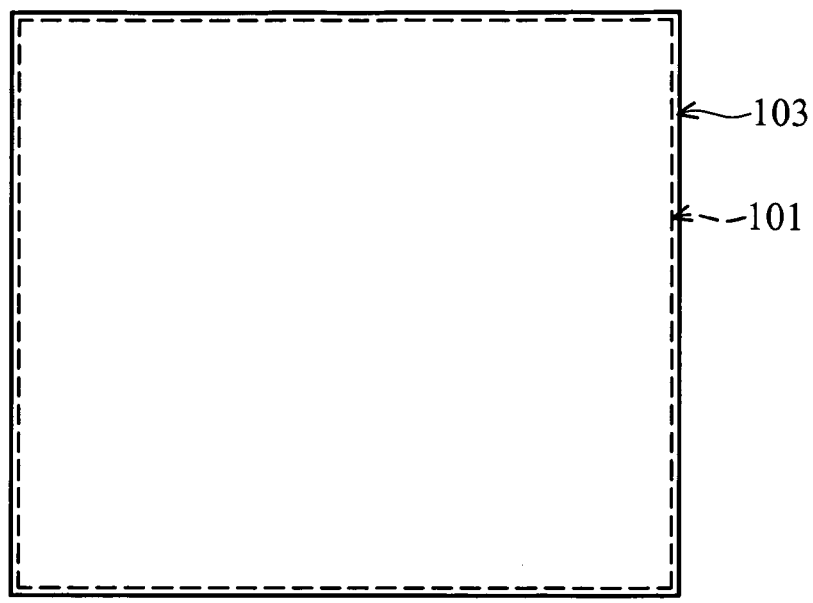
FIG. 5a is a schematic diagram of a 2D image fully overlapping a parallax barrier pattern.

FIGS. 3a and 3b illustrate embodiments of parallax barrier patterns 101. In FIG. 3a, the parallax barrier pattern 101 comprises a plurality of dark strips 101a parallel to each other. In FIG. 3b, the parallax barrier pattern 101 comprises a plurality of dark strips 101a perpendicular to each other. The 2D image 103 may fully overlap the parallax barrier pattern 101, as shown in FIG. 5a, thereby completely transforming the 2D image 103 provided by the liquid crystal display device 104 into a 3D image.

Figure 1C:
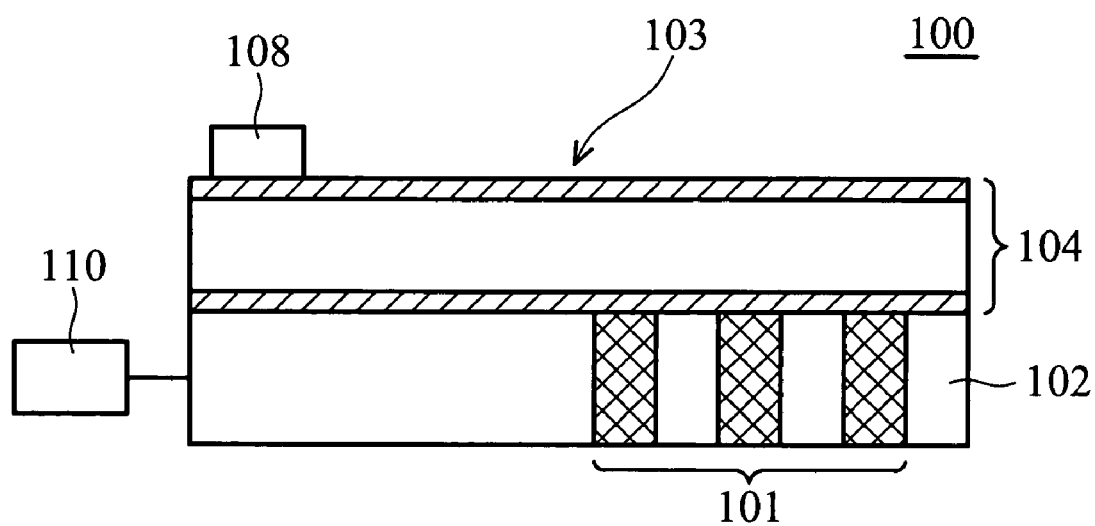
Figure 5B:
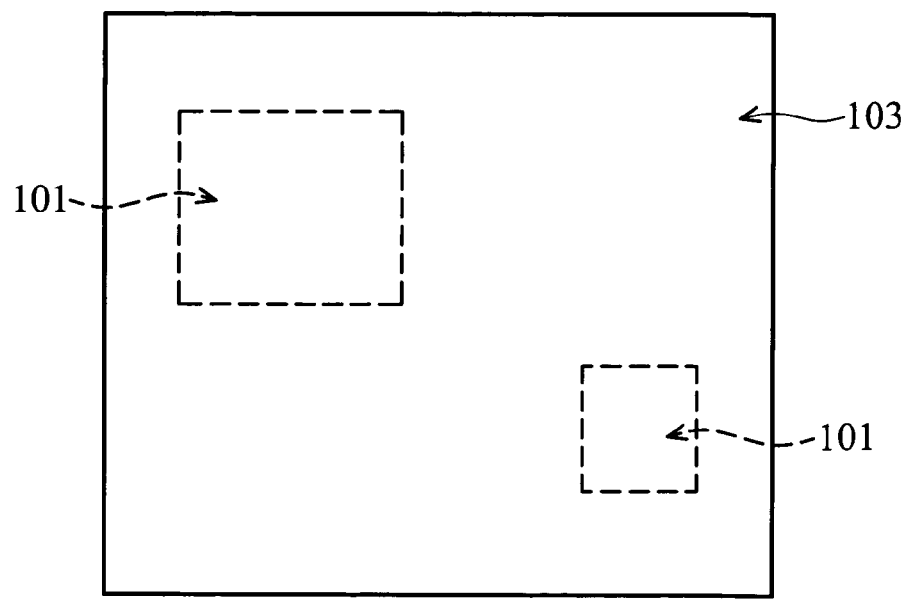
FIG. 5b is a schematic diagram of a 2D image partially overlapping a parallax barrier pattern.

FIG. 1c illustrates another embodiment of a method for forming a 3D image. In this embodiment, the difference from FIG. 1b is that the 2D image provided by the self-emissive display device 102 comprises a clear pattern and at least one parallax barrier pattern, such that the 2D image 103 in front of the parallax barrier pattern is transferred into the 3D image and that in front of the clear pattern is maintained without being transferred, as it is observed by a viewer from the liquid crystal display device 104 side. That is, the display 100 may simultaneously display 2D and 3D images. In this embodiment, the parallax barrier pattern partially overlaps the 2D image 103. Moreover, the number and size of the parallax barrier pattern and the position thereof with respect to the 2D image 103 can be adjusted according to demands, as shown in FIG. 5b.

Figure 2B:
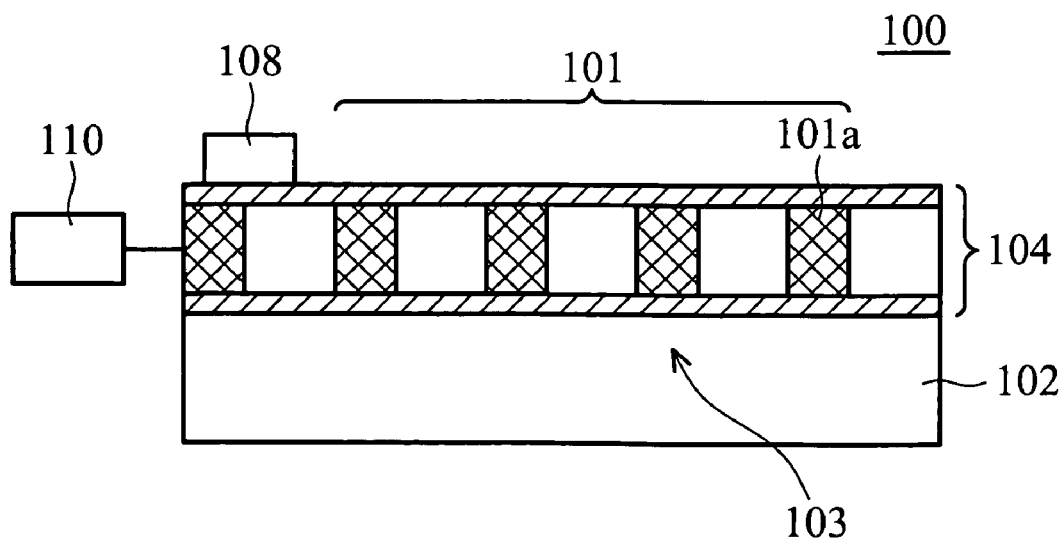

FIG. 2b illustrates yet another embodiment of a method for forming a 3D image. In this embodiment, the difference from FIG. 1b is that the 2D image 103 is provided by the self-emissive display device 102 and the 2D image with the parallax barrier pattern 101 provided by the liquid crystal display device 104 in front of the self-emissive display device 102, such that the 2D image 103 provided by the self-emissive display device 102 is transferred into the 3D image through the parallax barrier pattern 101, as it is observed by a viewer from the liquid crystal display device 104 side.

Figure 2C:
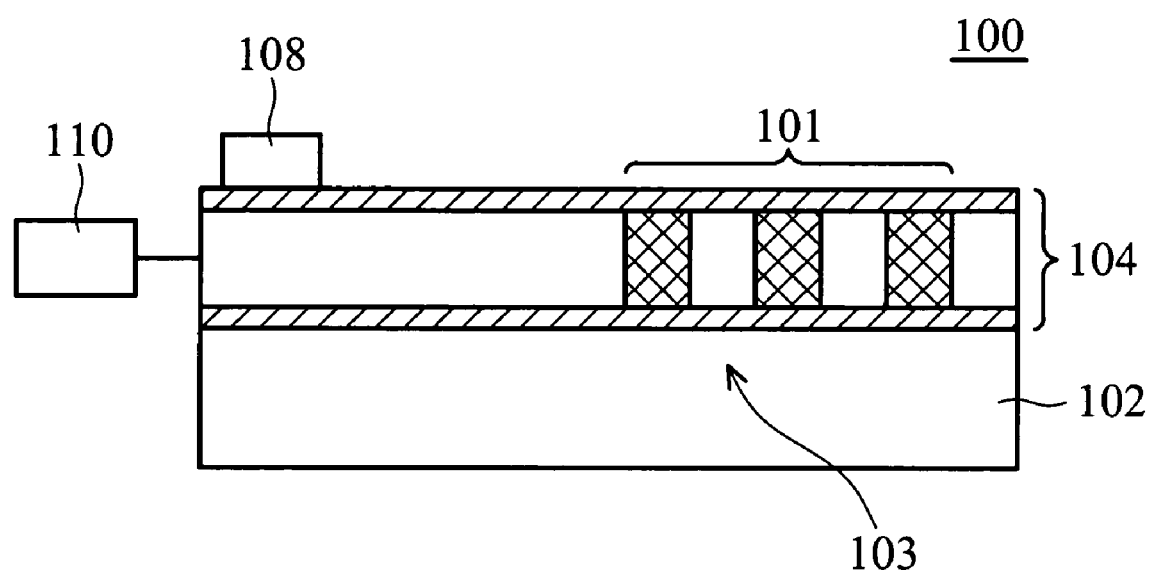

FIG. 2c illustrates further another embodiment of a method for forming a 3D image. In this embodiment, the difference from FIG. 2b is that the 2D image provided by the liquid crystal display device 104 comprises a clear pattern and at least one parallax barrier pattern, such that the 2D image 103 behind the parallax barrier pattern is transformed into the 3D image and the 2D image 103 behind the clear pattern is maintained without being transferred, as it is observed by a viewer from the liquid crystal display device 104 side.

Figure 4:
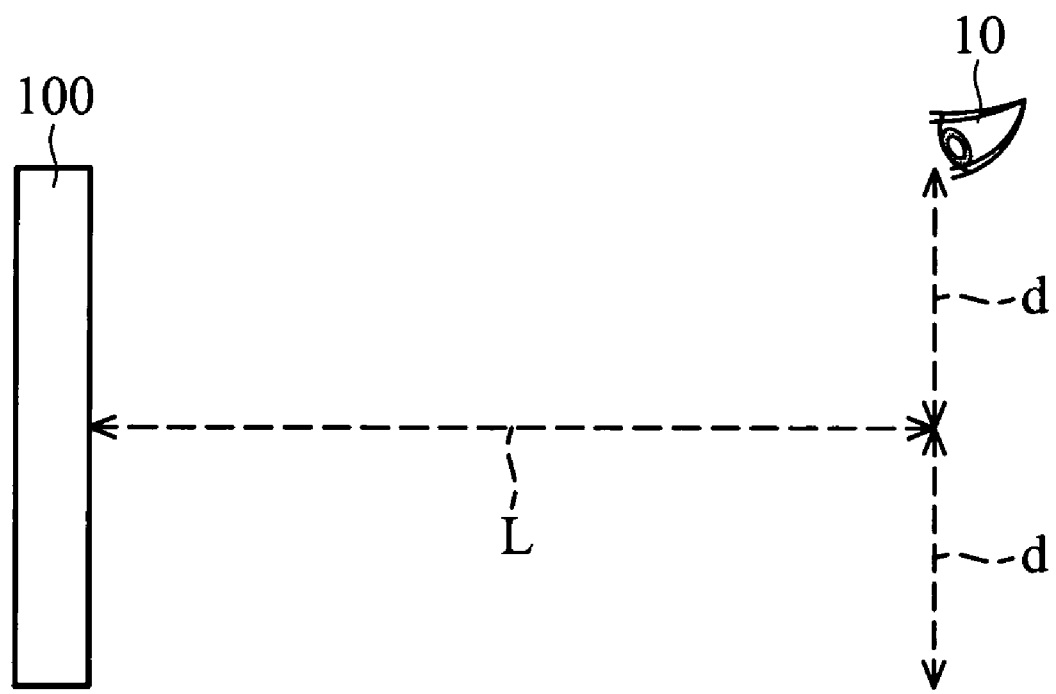
FIG. 4 is a schematic diagram of relative positions of a viewer and a display.

FIG. 4 is a schematic diagram of the relative positions of a viewer 10 and a display 100. In the embodiments of FIGS. 1b, 1c, 2b, and 2c, a perpendicular distance L and a parallel distance of the viewer 10 to the center of the display 100 can further be measured. Next, in the parallax barrier pattern 101 (as shown in FIG. 3a or 3b), the width of each dark strip 101a and the space therebetween can be adjusted according to the perpendicular distance L. Moreover, the shift of the dark strips 101a in a perpendicular direction can be adjusted according to the parallel distance d.

According to the 2D/3D display of the invention, since the self-emissive display device does not require a backlight device, power consumption can be reduced. Moreover, since the parallax barrier pattern is provided by the self-emissive display device or the liquid crystal display device, the 2D and/or 3D images can be provided. Furthermore, the relative positions between the 2D and 3D images can be randomly changed by adjusting the number, size, and position of the parallax barrier pattern.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A 2D/3D display, comprising:
   a liquid crystal display device for providing a first image; and
   a self-emissive display device disposed on the rear of the liquid crystal display device for providing a backlight source and a second image;
   wherein one of the first and second images comprises a parallax barrier pattern for forming a 3D image, and a 2D image.

2. The 2D/3D display as claimed in claim 1, wherein one of the first and second image comprises a clear pattern when the display is in a 2D mode and the parallax barrier pattern comprises a plurality of dark strips parallel or perpendicular to each other when the display is in a 3D mode.

3. The 2D/3D display as claimed in claim 1, further comprising:
   a detector coupled to the liquid crystal display device for measuring a distance between a viewer and the display; and
   a control device coupled to the display device that provides the parallax barrier pattern, to adjust the parallax barrier pattern in a 3D mode according to the distance.

4. The 2D/3D display as claimed in claim 1, wherein the self-emissive display device comprises an organic light-emitting device or a plasma display device.

* * * * *